United States Patent [19]

Sanjurjo et al.

[11] Patent Number: 4,676,968

[45] Date of Patent: Jun. 30, 1987

[54] MELT CONSOLIDATION OF SILICON POWDER

[75] Inventors: Angel Sanjurjo, San Jose; Kenneth M. Sancier, Menlo Park, both of Calif.

[73] Assignee: Enichem, S.p.A., Milan, Italy

[21] Appl. No.: 758,602

[22] Filed: Jul. 24, 1985

[51] Int. Cl.$^4$ ............................................. C01B 33/02
[52] U.S. Cl. ................................. 423/350; 423/348; 423/349
[58] Field of Search ....................... 423/350, 348, 349

[56] References Cited

U.S. PATENT DOCUMENTS

| | | | |
|---|---|---|---|
| 3,177,100 | 4/1965 | Mayer et al. | 423/350 |
| 3,442,622 | 5/1969 | Monnier et al. | 423/348 |
| 4,388,286 | 6/1983 | Kapur et al. | 423/348 |
| 4,442,082 | 4/1984 | Sanjurjo | 423/350 |

FOREIGN PATENT DOCUMENTS

| | | | |
|---|---|---|---|
| 2933164 | 2/1981 | Fed. Rep. of Germany | 423/348 |
| 0100911 | 6/1982 | Japan | 423/348 |

OTHER PUBLICATIONS

Effect of Physical Parameters on the Reaction of Graphite with Silica in Vacuum, Haas et al., 1968 [Abstract Only].

*Primary Examiner*—John Doll
*Assistant Examiner*—Lori S. Freeman
*Attorney, Agent, or Firm*—Hedman, Gibson, Costigan & Hoare

[57] ABSTRACT

A process is disclosed for the melt consolidation of silicon powder which is based on the use of a critical partial vacuum of 200–300 torr of an inert gas that is applied.

7 Claims, No Drawings

MELT CONSOLIDATION OF SILICON POWDER

BACKGROUND OF THE INVENTION

A process for the preparation of highly pure, elemental silicon and other transition metals is disclosed in U.S. Pat. No. 4,442,082 which may be practiced by the reduction of a silicon tetrahalide using an alkali metal. That patent is incorporated by reference. High purity silicon is useful for the direct production of electricity from solar energy and for other purposes.

Briefly, the process for the preparation of silicon is based on the reduction of a silicon tetrahalide such as silicon tetrafluoride in the vaporphase by the use of an elemental form of an alkali metal such as sodium which produces a mixture of an alkali metal fluoride and elemental silicon.

After the reaction is complete aqueous leaching of the reaction mixture is usually employed to separate the alkali metal fluoride. Thereafter, melt consolidation may be used to prepare a polycrystalline silicon material that is suitable for use in Czochralski crystal pulling procedures.

The present invention is concerned with the discovery of the use of a critical range of a partial vacuum for the melt consolidation of a polycrystalline silicon powder. The use of a partial vacuum results in the removal of any trace amounts of carbon as well as the removal of any silica that is formed from the oxidation of silicon. In addition, the use of a partial vacuum permits the removal of trace amounts of boron and sodium which may be detrimental to the use of silicon for solar generation of electricity.

U.S. Pat. No. 4,388,286 describes a method for the purification of silicon which is based on heating silicon sawdust in an argon atmosphere adding sodium fluoride and thereafter applying a high vacuum (10 torr) to remove carbon as gaseous carbon monoxide and silica as silicon monoxide. The product obtained by this process is disclosed as containing slag and having a high sodium content. The application of the high vacuum causes the melted silicon to bubble and splatter from the crucible resulting in product losses. Accordingly, it is a primary object of this invention to provide an improved process for the melt consolidation of powdered silicon in a highly pure form.

It is also an object of this invention to provide a process for removing small amounts of carbon, boron and sodium from elemental silicon powder in a melt consolidation process.

DETAILED DESCRIPTION OF THE INVENTION

The process may be practiced by heating the powdered polycrystalline silicon in an inert atmosphere such as argon while raising the temperature at a rate of about 5° to 20° C. per minute for 1 hour to 400° to 800° C. and then to 1400° to 1500° C. in 30 minutes. A vacuum of 200–300 torr is applied during the heating stage. A higher vacuum should not be used as it has been found that the use of higher vacuum causes violent bubbling of the silicon with substantial losses of silicon by splattering. The melt is kept under partial vacuum until bubbling stops.

Generally any vacuum furnace having variable temperature controls may be used. The rate of temperature increase is not critical and it may be varied provided that the objectives of the process are achieved.

During the heating and melting, the silica present on the surface of the polycrystalline silicon should react to form silicon monoxide which is a gaseous material. The silica may also react with carbon to form carbon monoxide and silicon monoxide or silicon carbide. Some of the reactions that can take place are listed in Table 1.

TABLE 1

Equilibria: Si—C—O System

| | |
|---|---|
| $SiO_2 + C = SiO + CO$ | 1. |
| $SiO_2 + 2C = Si + 2CO$ | 2. |
| $SiO_2 + 3C = SiC + 2CO$ | 3. |
| $SiO + C = SiC + CO$ | 4. |
| $SiO_2 + 2SiC = 3Si + 2CO$ | 5. |
| $SiO_2 + SiC = SiO + CO + Si$ | 6. |
| $Si + SiO_2 = 2SiO$ | 7. |
| $SiC + SiO = Si + CO$ | 8. |

The CO pressure resulting from equilibria 3 and 4 seem to be responsible for bubbling of the melt at pressures below 200 torr.

DESCRIPTION OF THE PREFERRED EMBODIMENTS

Silicon powder was loaded in a quartz crucible that was placed inside graphite crucible to provide mechanical support for the quartz at high temperatures. The loaded crucibles were placed in the hot zone of a resistance heated vacuum furnace. The temperature was measured by means of a Pt/Pt-Rd 10% thermocouple, with the tip placed against the bottom of the graphite crucible. For all preliminary work a silicon powder produced by solid or liquid feed of sodium and silicon tetrafluoride was used.

The quartz crucibles had a 7.5 cm o.d., were 12.5 cm high and 2 mm thick with a flat bottom. These crucibles were manufactured by Quartz International, Santa Clara, CA from silica stock used for semiconductors. The crucibles were washed with 10% HF solution and rinsed with distilled water before being used. Silicon powder was loaded in the crucibles in a laminar flow hood to avoid airborne contamination. The quartz crucibles were wrapped in Grafoil and loaded in a graphite crucible that acts both as a susceptor and as a mechanical support for the silica crucible at high temperatures.

The loaded crucibles were transported to the furnace in a plastic bag to avoid contamination. The loaded crucibles were placed in the heating zone of the RF coils. The RF water-cooled coils were thermally insulated from the hot crucible by a silica felt layer and two graphite felt layers. The chamber was then evacuated and the sample was heated.

The furnace was slowly evacuated to avoid vigorous degassing of the silicon powder, which may cause bubbling of the bed of silicon powder and loss of silicon by splattering. Typically the silicon was heated to 600° C. under vacuum at a rate of 10° C. per minute for an hour and then to 1425° C. in 30 minutes. The silicon melt was observed to bubble and the surface to become free of slag. The silicon melt was subsequently cooled in argon. The results are summarized in Table 2.

The specific conditions in which several melts took place are set forth in Table 2.

TABLE 2

| RUN | SILICON CHARGE (g) | INITIAL CONDITIONS | CONDITION DURING HEATING AT 1400° C. | MELT CONDITIONS | COOLING TIME IN ARGON (hr) | RESULTS |
| --- | --- | --- | --- | --- | --- | --- |
| 1 | 190 | Evacuated and refilled with Ar | 250 torr | 1450° C. 250 torr, 15 minutes | 0.5 | 99% Si melted |
| 2 | 421 | Evacuated and refilled with Ar | 250 torr | 1500° C. 250 torr | 0.5 | silica volatilized as SiO and reacted with graphite form SiC |
| 3 | 205 | Evacuated and refilled with Ar | 250 torr | 1410° C. 200 torr (±50 torr) | 0.5 | silicon totally melted, silicon recovery yield = 98% |
| 4* control | 213 | Evacuated, Refilled with Ar and heated and evacuated simultaneously | 500–0.5 torr | 1410° C. 0.07 Torr bubbling violently 12 min | 0.5 | ⅔ on bottom melted no slag |
| 5* | 286 | Evacuated, Refilled with Ar and heated and evacuated simultaneously | | 1410° C. 250 torr gentle bubbling 150 torr violent bubbling | | |
| 6* control | 286 | Ar | Ar, 760 torr | Ar, 760 torr | 1 | silica ingot with slag; silicon recovery 96% |

We claim:

1. A method of melt consolidating silicon obtained from the reaction of silicon tetrafluoride and sodium said method comprising heating said silicon to the melting point by increasing the temperature at a rate of 5°–50° C. per minute under a partial vacuum of 200–300 torr of inert gas, and thereafter maintaining the silicon in a melted condition for a sufficient period of time for the surface of the melted silicon to become free of slag.

2. A method of melt consolidating silicon powder as defined in claim 1 wherein the temperature is increased at a rate of about 10° C. per minute.

3. A method of consolidating silicon powder as defined in claim 1 wherein the temperature is increased at a rate of about 5°–20° C. per minute.

4. A method of consolidating silicon powder as defined in claim 3 wherein the temperature is increased at a rate of about 10° C. per minute.

5. A method of melt consolidating silicon powder as defined in claim 1 wherein the inert gas in the reactor is evacuated at a rate of 10 to 100 torr per minute to avoid splattering the silicon powder.

6. A method as defined in claim 1 wherein the silicon is heated to a temperature of 1405°–1409° C. and then argon is admitted to a partial pressure of about 200 torr.

7. A method of melt consolidating silicon powder obtained from the reaction of silicon tetrafluoride and sodium, said method comprising heating said silicon powder, under a partial vacuum of 200–300 torr of an inert gas at an increasing temperature rate of about 5° to 20° C. per minute, until the silicon powder melts and thereafter maintaining the temperature above the melting point until the slag is substantially removed by volatilization.

* * * * *